Figure 5:

Nov. 11, 1941.    G. S. MIKHALAPOV    2,262,693
ELECTRIC WELDING
Filed Aug. 7, 1939    2 Sheets-Sheet 1
Fig. 1.
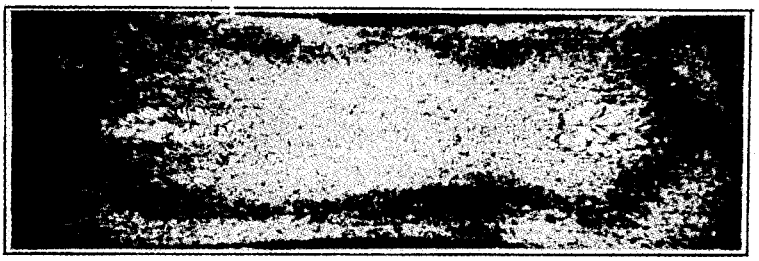
LONGITUDINAL CROSS SECTION OF .18"D SPOT WELD
WITH GOOD STRENGTH AND TOUGHNESS 35X
Fig. 2.
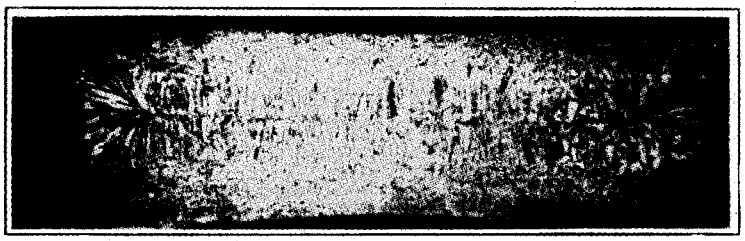
LONGITUDINAL CROSS SECTION OF .18"D SPOT WELD
WITH LOW STRENGTH AND TOUGHNESS 35X
Fig. 3.    Fig. 4.
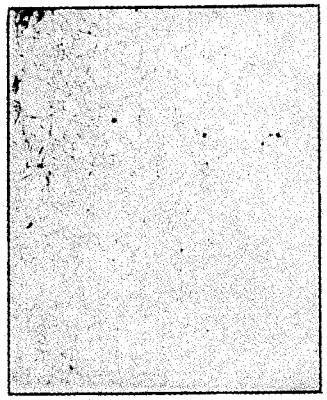    
SAME AS FIG. 1 MID-SECTION    SAME AS FIG. 2 MID-SECTION
AT 200 X    AT 200X    INVENTOR
George S. Mikhalapov
By John Howard Joynt
His Attorney Nov. 11, 1941.  G. S. MIKHALAPOV  2,262,693
ELECTRIC WELDING
Filed Aug. 7, 1939  2 Sheets-Sheet 2

FRACTURE OF STRONG
TOUGH WELD 2X

SAME AS FIG. 5 AT 10X
SHOWING THE FINE GRAINED
FRACTURE AT CORONA OF WELD

FRACTURE OF WEAK
BRITTLE WELD 2X

SAME AS FIG. 7 AT 10X
SHOWING THE COARSE GRAINED
FRACTURE AT CORONA OF WELD

INVENTOR
George S. Mikhalapov
By John Howard Joynt
HIS ATTORNEY

Patented Nov. 11, 1941

2,262,693

UNITED STATES PATENT OFFICE 2,262,693

ELECTRIC WELDING

George S. Mikhalapov, Philadelphia, Pa., assignor to Rustless Iron and Steel Corporation, Baltimore, Md., a corporation of Delaware Application August 7, 1939, Serial No. 288,888

3 Claims. (Cl. 219—10)

My invention relates to the welding of alloys, and more especially to the welding of heat-hardenable alloy irons and steels, particularly the air-hardenable stainless irons or steels.

One of the objects of my invention is to spot-weld alloy products in a simple, rapid and efficient manner to achieve a product with welds of uniform high strength and ductility.

Another object is to spot-weld air-hardenable alloy irons and steels, especially the air-hardenable rustless irons and steels, in such manner as to achieve strong, tough and ductile welds of high durability and impact value, and which are substantially free from brittleness.

Another object is to produce welded products which are strong, ductile and free of brittleness by a spot-welding fabricating process which is characterized by the absence in the region of the weld of dendritic crystal structure.

Other objects will be obvious in part, and in part pointed out hereinafter.

The invention accordingly consists in the several steps of operation and the relation of each of the same to one or more of the others, the scope of the application of the invention being indicated in the accompanying claims.

In the drawings, Figures 1 through 8 inclusive are photomicrographs of spot-welds illustrating certain features of my invention.

As conducive to a better understanding of my new invention, it may be noted at this point that there are a number of alloy irons and steels and other alloy metals which are so sluggish in their actions that cooling merely from welding temperatures will cause them to harden at the weld. I intend to cover not only those steels which owe their peculiar properties to the presence of one or more elements in addition to carbon, or to the joint action of such elements and carbon, which render them hardenable in air, but also those other steels and metal alloys which have the property of hardening during spot-welding operations.

Typical of the air-hardenable alloy steels are the stainless irons and steels wherein there is employed a chromium content ranging from 12%, or less, up to as much as 30%, perhaps with nickel additions up to as much as 2%. In such cases, carbon is present up to say 0.30%, the value of carbon generally being high for the higher chromium contents. Where the higher chromium contents are employed, nickel and carbon usually are present to assure hardenability and strength. Molybdenum also may be present, especially in the steels of the higher chromium contents, in amounts up to say 2%.

The manganese content of the hardenable stainless steels preferably is kept low, because of the tendency of this metal to cause embrittlement. The silicon content likewise is ordinarily maintained at low values because of the embrittling tendencies of this ingredient. In no case should the content of either of these two ingredients exceed about 1%. Manganese, which participates in the hardening action, is now used to the extent of 0.80% in a typical 12% chromium steel. It is to be understood, however, that the examples given are purely illustrative of a typical sluggish, air-hardenable alloy steel, and are by no means intended as being all-inclusive.

Now outside of the field of air-hardenable steels there are many steels which are normally considered to be only water or oil-hardening, that is, requiring a more rapid quench than air. A number of these steels, altho not air-hardenable, are found to be hardenable when subjected to conventional spot-welding practices. This is due to the high rate of cooling which occurs at the weld, a phenomenon which occurs for reasons which will be pointed out hereinafter. Particularly is the hardening action emphasized when the spot-welding electrodes are allowed to rest or dwell on the metal following the passage of welding current, the electrodes thereby rapidly conducting heat away from the metal and chilling and hardening it. This phenomenon has made known spot-welding techniques unsuitable for such steels, as well as those steels known to be air-hardenable.

Accompanying the hardening of the weld-hardenable steels, there is a tendency towards embrittlement. This is especially pronounced in known spot-welding practices and appears to vary with the composition and properties of the metal undergoing treatment. It is so severe in the case of some metals that it has hitherto been considered to be impossible successfully to spot-weld them. Investigation of these steels, after they have cooled following the usual spot-welding operation, shows that the weld bead is extremely dendritic with coarse grains progressing perpendicularly from the contact faces of the pieces welded. The weld bead is hard and brittle, as contrasted with the desired tough, ductile and small-grained structure of the parent metal back from the weld.

The brittleness attending the spot-welding of certain alloy steels in the conventional manner has been found to manifest itself in any one or more of several different ways. A decrease in the impact strength of the weld is observed. Also there is a decrease in the static tensile strength, especially where the stress is applied perpendicularly to the plane of the weld, that is the weld faces. In extreme cases, actual cracks in the weld metal are noted. Apparently, these form either during the cooling following the welding step itself, or shortly thereafter.

Brittleness and low ductility are manifested not only by the metal of the weld itself, but also, in some cases, by the parent metal immediately adjacent the weld metal, that is to say, in the general region of the weld. When the weld metal alone is brittle, greatest difficulty is experienced when the sections of metal welded are of such rigidity and stiffness as to resist distortion when stress is set up in the weld metal, that is when the thickness of the metal sections exceed some 0.050 inch to 0.062 inch. In such instances the resistance to distortion of the parent metal is such that when stress occurs in the weld metal, there is a tendency for separation at the weld, this failure taking place through the weld at the plane of contact of the sections welded. When both the weld metal and the adjacent parent metal have become embrittled, then even in the case of metal sections of light gauge, where normally all distortion under stress would lie outside the weld metal, failure is frequently encountered, due to the varying stresses encountered in actual practical use.

Prior investigations lead to the conclusion that the conventional variations of welding technique, such as random alteration of the time of the weld, the intensity of the current employed, and the pressure of the welding electrodes, does not vary appreciably the degree or extent of weld embrittlement. Little benefit was had through flattening the temperature gradient between spot-weld and surrounding metal by preheating the adjacent metal. In addition, it did not appear to be practical to raise the temperature of the adjacent metal an amount sufficient to diminish the embrittlement effect of the weld treatment.

Because of the importance of spot-welding as a method of fabrication an important object of my invention is to avoid the disadvantages of known spot-welding technique as applied to the weld-hardening alloy steels, and to evolve a technique which produces a strong, tough and ductile weld in a simple, rapid and direct manner, employing welding equipment of a rugged and comparatively inexpensive character.

In accordance with my invention I have found that weld embrittlement is due, at least in part, to the formation of a coarse-grained dendritic structure in the neighborhood of the weld. I have found that an improvement in the weld is realized, both in cases where the hardening occurs in the parent metal, as well as when it occurs in the weld itself, when efforts are made toward increasing vastly the temperature gradient between the molten weld metal and the adjacent parent metal. Such efforts result in limiting the total amount of energy dissipated in the parent metal. A limitation in this energy minimizes the heating effect on the metal adjacent to the weld, and consequently minimizes the total volume of parent metal reaching the temperature necessary for the hardening phenomenon. In other words, where the total heat energy absorbed by the weld metal during the process of melting is dissipated in the parent and electrode metal without raising an appreciable part of the parent metal to the critical temperature, there is no substantial hardening of the metal adjacent the weld. Although this ideal condition is not fully reached in practice, I find that from a practical standpoint, a very satisfactory approach to it is made by greatly increasing the electrical power at which the spot-weld is formed. This is had through greatly increasing the weld current and at the same time greatly decreasing the time of current flow.

In accordance with my invention, I find that when the growth of the large-grained dendritic crystals is inhibited in the first place, confining the weld bead insofar as possible to a small grained equi-axed pearlitic crystal structure, the bead has substantially the same strength and ductility as the surrounding parent metal. The necessity for any after-treatment is avoided. It will be understood, however, that a heat-treatment may be employed where desired.

I have discovered that a highly satisfactory weld can be produced between sections of weld-hardenable alloy metals, by passing therethrough an electric current of high intensity for an interval just sufficient to bring the metal sections to welding temperature. Where, at the same time, the duration of current application is kept sufficiently short to ensure that the time interval of high temperature maintenance at the weld is insufficient to foster the rapid crystal growth which is encountered at such temperatures, the resultant weld is found to be characterized by the absence of dendritic structure. A weld produced by my new technique exhibits markedly advantageous qualities of strength, toughness, and ductility. It is evident, therefore, that the development in spot-welding of a method of producing a proper crystal structure in the region of the weld is of great importance.

In the practice of my invention, I prefer to place the electrodes in opposition to each other, one on each side of the sections to be welded. While any suitable welding electrodes may be used, I choose to employ electrodes of one and a quarter inch diameter, having rounded contact ends, which are turned about a radius of say three inches. These electrodes are forced with considerable pressure against the sections to be welded, preferably in th neighborhood of at least 1000 pounds. The resultant contact area is found to be about 0.032 square inch. Simple calculation, therefore, shows the pressure density is of the order of 31,000 pounds per square inch. I have found that for different desired current values, depending not only upon the intensity with which it is desired to carry out the welding step but also upon the metals undergoing treatment and the dimensions of the sections to be welded, the pressure with which the electrodes are applied against the work may be varied within certain limits. This is desirable in order to lower the electrical resistance of the weld.

The high mechanical pressures with which the electrodes are applied to the metal strips or sections to be welded have the effect of reducing the surface electrical resistance, or contact resistance, between the metal sections themselves as well as the resistance between the metal sections and the electrodes. This facilitates the passage of current through the region of the weld. For a given impressed voltage, the weld current will be increased upon an increase of pressure. In low impedance welding equipment, this increase is substantial although in the high impedance equipment, the change is almost imperceptible.

In accordance with my invention, the weld current is permitted to flow for but a very brief interval. In welding .030 inch sections best results are had with a current flow of from one-half to one cycle of a sixty-cycle current (that is to say, for from 1/120 to 1/60 of a second). For heavier sections, a longer current dwell is permitted, while for lighter sections, a shorter dwell is desired. The use of intense welding currents for such short welding periods gives highly satisfactory welds. The weld bead is of a fine even grain structure. The grains are substantially equi-axed. Dendritic crystals, if present at all in such welds, are found to be confined substantially to the outer fusion zone.

While the duration of the passage of the current across the electrodes has been measured in the foregoing in terms of the number of cycles of sixty-cycle welding current, it is apparent that 25-cycle, 15-cycle, direct current, or any other suitable welding current may be employed. The criterion is that the passage of a sufficiently high current, with sufficient pressure of the electrodes on the weld section, endures for a length of time sufficient to raise the weld section to the welding temperature, yet insufficient to permit the development of appreciable dendritic structure. Experience has shown that this time interval ranges approximately between 1/120 of a second and 1/60 of a second; at least it is preferably less than 1/60 of a second.

Reduction of time of current dwell below ½ cycle, in the case of sixty-cycle current, was found to be impractical, inasmuch as extreme difficulty was encountered in raising the metal in the region of the weld section to fusion temperature, even when very high electrical currents were employed.

The current required, in order to ensure the production of sufficient heat throughout the weld section, must vary inversely in proportion to the duration or dwell of the welding current. Thus, with a current dwell of say only ½ a cycle, the current must be substantially higher than that required for a one cycle dwell, in order that the desired quantum of electricity may be passed through the weld section. As has been suggested in the foregoing, where the pressure at which the electrodes are applied to the metal strips is increased, then the current at a given rated voltage likewise is increased.

From my investigations of the loading conditions under which embrittled spot-welds fail in practice, I conclude that these are primarily due to static shear and to fatigue, or repeated loading. Rough handling, sudden blows or shocks, or accidental impacts may impose other stresses, for example, impact shear or tension. These stresses are found to combine in unpredictable ways. I have found, however, that a static tension test is an entirely satisfactory measure of the toughness and ductility of a spot-weld, and so I have employed this simple test for determining the criteria by which the success of my new method is measured. This static tension test, of course, is one in which the weld is pulled apart by the steady application of a force along an axis normal to the plane of the weld, that is normal to the contacting surfaces of the welded sections.

Comparative experimental data on a number of welds made on sections of air-hardenable stainless steel strip are presented below in Tables I and II.

TABLE I

Single spot-welds on 0.030 inch sections of stainless steel strip analyzing chromium 12.48%, nickel .59%, molybdenum 0.41%, manganese 0.75%, silicon 0.44%, carbon 0.06% with the balance iron having a hardenability of about 326 Brinell. Sixty cycle alternating current is used. Electrodes are copper 1¼ inches in diameter with ends rounded at a 3 inch radius.

| Specimen | Current dwell in cycles | Current in amps. | Electrode pressure in pounds |
|---|---|---|---|
| 608 | 1 | 13,500 | 1,000 |
| 609 | 1 | 15,000 | 1,100 |
| 602 | 1 | 16,500 | 1,000 |
| 610 | 1 | 18,000 | 1,500 |
| 613 | ½ | 24,500 | 1,250 |
| 614 | ½ | 27,000 | 2,300 |

TABLE II

Tests on the welds of Table I

| Specimen | Static tension, pounds | Impact shown, foot-pounds | Diameter weld in inches |
|---|---|---|---|
| 608 | 384 / 366 / 532 / 398 | 9.2 / 8.0 / 7.8 / 9.0 | ---------- |
| 609 | 460 / 492 / 386 | 8.4 / 9.0 / 9.2 | About .185 |
| 602 | 478 / 306 | 10.2 / 10.0 | ---------- |
| 610 | 392 / 388 / 480 | 11.2 / 12.0 / 11.2 | ---------- |
| 613 | 440 / 344 / 428 | ---------- | .193 to .208 |
| 614 | 622 / 652 / 654 / 636 | ---------- | .227 to .240 |

Careful consideration of the data of Tables I and II shows that excellent welds are obtainable, without the necessity of subsequent treatment, by current dwells of but ½ to 1 cycle, sixty cycle current being assumed. All of the 1 cycle welds made with currents ranging from 13,500 amperes to 18,000 amperes, and with pressures ranging from 1000 pounds to 1500 pounds, developed consistently improved physical properties. Simple calculation based on the size of the weld bead and the weld current employed shows that the density of the welding current ranges upward from 557,000 amperes per square inch for specimen 609, to values approaching one million amperes per square inch for some of the other specimens.

The ½ cycle welds, made at current values ranging from 21,000 amperes to 27,000 amperes, and at pressures ranging all the way from 1250 pounds to 2300 pounds, displayed marked variations depending upon the particular practice controlling their formation. Such welds are unquestionably superior when the higher currents and electrode pressures are employed. In point of fact, weld beads formed at ½ cycle, at currents of 27,000 amperes and with electrode pressures of 2300 pounds, as established in connection with specimen 614 of Tables I and II are found to exhibit the greatest strength. The investigations indicate that use of the lower currents and pressures result in incomplete fusion.

It is to be noted from a consideration of Tables I and II that the ½ cycle welds, made at high electrical currents and high electrode pressures, are larger in diameter than are the 1 cycle welds. This larger diameter of the weld-spot no doubt contributes to the good physical properties of these welds, and in most instances is not detrimental, the principal requirements being the production of strong and tough welds. In this connection it is significant that these larger diameter welds, produced at ½ cycle produce the best physical properties.

A summary of the data presented in Tables I and II shows that the 1 cycle dwells produced welds ranging from 384 pounds to 532 pounds static tensile strength, with an average of about 450 pounds, or 16,300 pounds per square inch; while the ½ cycle welds ranged from 344 to 654 pounds, with an average of 530 pounds, or slightly less than 15,000 pounds per square inch. The impact resistance is found to range from 7.0 to 12.0 foot pounds, with an average of about 9.5 foot pounds. Just as would be expected, the highest impact values are obtained with the higher electrical currents and higher electrode pressures.

To contrast sharply the desirable results of my short dwell-high current practice with the conventional long dwell low current methods hitherto used, reference is made to Table III clearly showing the greater strength of the welds made in accordance with my invention.

TABLE III

| Welding conditions | | | | Static tension | |
|---|---|---|---|---|---|
| Current in amperes | Weld resistance in ohms* | Time-current cycles | Weld diameter in inches | Pounds | Pounds/sq. in. |
| 9,000 | .00013 | 4 | .18 | 250–300 | 9,820–11,800 |
| 15,000 | .000107 | 1 | .18 | 400–450 | 15,750–17,700 |

*Estimated approximate values.

An explanation of the superior results had in accordance with my invention is found in the accompanying drawings, wherein Figure I illustrates, at a magnification of 35 diameters, a longitudinal cross-section of a spot-weld of 0.18 inch diameter, produced by a 1 cycle dwell at a current of 15,000 amperes. This specimen, of good strength and toughness, displayed a static tensile strength of 400–450 pounds as reported in Table III. Figure 3 is a photomicrograph of the mid-section of the same specimen as Figure 1, but magnified to 200 diameters.

These two figures illustrate the fine-grained equi-axed crystals composing the greater extent of the weld. The duration of the dwell was so brief that dendritic growth was inhibited in all portions of the weld except at the outer fusion zone. The interlocking nature of the crystals is evident from Figure 3. The weld of these two figures displays a toughness and structure resembling that of wrought or heat-treated steel. A photomicrograph of a section of a satisfactory weld produced at a ½ cycle dwell would show the crystals approaching the point of virtual disappearance.

The small, interlocking grains of the weld of Figures 1 and 3 are to be contrasted with that depicted in the photomicrographs of Figures 2 and 4, for a specimen of low strength and toughness, formed by the conventional low-current, long-dwell method. Welds of such character are both weak and brittle. In the production of this weld, 9000 amperes were passed between the electrodes for a 4 cycle dwell. Static tensile strength was found to range from 250 pounds to 300 pounds as noted above in Table III. The striking growth of long-grained, dendritic crystal structure, with sharp line of demarcation between the metal strips, is to be noted. The crystal structure of this specimen is similar to that of cast metal.

Figure 6:
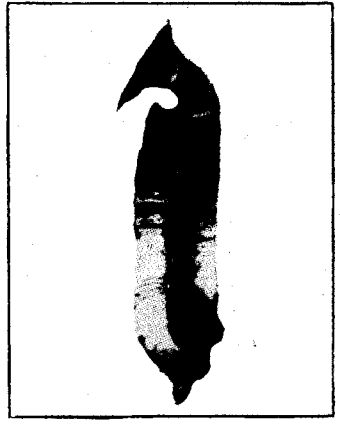
Figure 7:
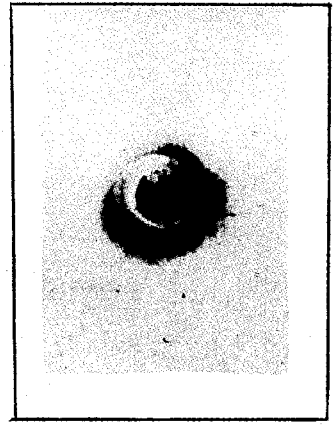
Figure 8:

A comparison of the mode of failure of tough and brittle welds may be had by reference to Figures 5 and 6 on the one hand, and Figures 7 and 8 on the other hand. In the weld of Figures 5 and 6, produced according to my new high current-short dwell practice, the weld itself did not fracture. Rather, failure occurred in the surrounding parent metal. In the weld of Figures 7 and 8, however, the conventional low-current long-dwell practice is represented. Here failure at low stress occurred in the weld, the weld, due to its brittleness, being completely torn out of the surrounding parent metal.

Thus, according to my new method of spot-welding, employing short dwell and high electrical currents, the various objects of my invention, together with many thoroughly practical advantages, are obtained. Vastly increased and advantageous properties of strength, toughness and ductility are impaired to the weld. Moreover, it becomes possible to weld successfully many alloy steels which have hitherto been considered as being incapable of successful spot-welding due to their weld-hardening characteristics. My new technique can be utilized with either manual or automatic manipulation of the metal sections being welded. A series of spot-welds may be made rapidly and efficiently. Very little additional equipment is required. The invention, therefore, is characterized by its extreme simplicity, efficiency, and economy.

Metal sections of all sorts may be successfully spot-welded according to my new technique. These include sheet, strip, thin plate and the like, as used, for example, in the fabricated parts of aircraft. The sections may be as thin as say 0.009 inch, or they may be of more important dimensions, that is, extending to the thickness limit for sheet and strip of 0.141 inch. In the case of heavier gauges, the electrical energy supplied to the weld is increased to compensate for the additional heat losses resulting from the greater dissipating mass of metal which is present. From a practical standpoint there is little difficulty in bringing the metal to welding temperature, since even with available equipment it is feasible to use electrical currents as high as 100,000 amperes or more.

As many possible embodiments may be made of my invention, and as many changes may be made in the embodiments hereinbefore set forth, it will be understood that all matter described herein or shown in the accompanying drawings, is to be interpreted as illustrative, and not as a limitation.

I claim:

1. In the spot-welding of sluggish, weld-hardenable ferritic and martensitic alloy steels, the art of producing a strong, tough and ductile welded junction between metal sections of the thickness of sheet and strip, which comprises applying electric-current carrying electrodes on opposite sides of the metal sections at high pressures, passing an electric current through the electrodes and through the metal sections between the electrodes of 13,500 amperes or more for approximately 1/60 of a second or less, giving a current density of 500,000 amperes per square inch or more for a time sufficient to ensure fusion between the metal sections in the region of the weld, but of duration so short as to inhibit effectively the development of dendritic crystal structure in that region.

2. In the spot-welding of sluggish, weld-hardenable ferritic and martensitic alloy steel sheet and strip, the art of producing a strong, tough and ductile welded junction between metal sections, which comprises applying electric-current-carrying electrodes on opposite sides of the metal sections at pressures of 1,000 pounds or more giving a pressure density of 31,000 pounds per square inch or more, passing 1/2 cycle to 1 cycle of 13,500 amperes or more of 60-cycle alternating electric current through the electrodes and through the metal sections between the electrodes giving a current density of 500,000 amperes per square inch or more for a time sufficient to ensure fusion between the metal sections in the region of the weld but of duration of application so short as to inhibit effectively the development of dendritic crystal structure in that region, and give a grain structure at the weld of substantially equi-axed crystals.

3. In the spot-welding of sluggish, air-hardenable ferritic and martensitic stainless steels consisting of 12 to 30 per cent chromium, nickel less than 2 per cent, carbon up to 0.30 per cent and the balance substantially all iron, the art of producing a strong, tough and ductile welded junction between metal sections of the thickness of sheet and strip, which comprises the steps of, applying electric-current-carrying electrodes on opposite sides of the metal sections, at pressures ranging from approximately 1,000 pounds to approximately 1500 pounds, giving pressure densities of the order of 30,000 to 45,000 pounds per square inch, to decrease the contact electrical resistance, passing electric currents through the electrodes and through the metal sections between the electrodes, at values ranging from the neighborhood of 13,500 amperes to the neighborhood of 18,000 amperes, for approximately 1/60 of a second or less, giving current densities at the weld of 500,000 amperes per square inch up to about 1,000,000 amperes per square inch for a time sufficient to ensure fusion between the metal sections in the region of the weld, but so short as to inhibit effectively the development of dendritic crystal structure in that region.

GEORGE S. MIKHALAPOV.